US012687888B2

(12) United States Patent
Lukanc et al.

(10) Patent No.: US 12,687,888 B2
(45) Date of Patent: *Jul. 21, 2026

(54) NETWORK-CAPABLE DOCKING STATION

(71) Applicant: Synaptics Incorporated, San Jose, CA (US)

(72) Inventors: Jeffrey Lukanc, San Jose, CA (US); Ganesha Tekkatte, San Jose, CA (US); Xuexin Liu, San Jose, CA (US); Bradley C. Malemezian, Atlanta, GA (US); Mark E. Miller, Mission Viejo, CA (US)

(73) Assignee: Synaptics Incorporated, San Jose, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 18/791,837

(22) Filed: Aug. 1, 2024

(65) Prior Publication Data

US 2024/0393833 A1 Nov. 28, 2024

Related U.S. Application Data

(63) Continuation of application No. 17/581,126, filed on Jan. 21, 2022, now Pat. No. 12,298,808.

(51) Int. Cl.
*G06F 1/16* (2006.01)
*G06F 8/65* (2018.01)

(52) U.S. Cl.
CPC .............. *G06F 1/1632* (2013.01); *G06F 8/65* (2013.01)

(58) Field of Classification Search
CPC ................................ G06F 1/1632; G06F 8/65
See application file for complete search history.

(56) References Cited

U.S. PATENT DOCUMENTS

| | | | |
|---|---|---|---|
| 7,949,797 | B2 | 5/2011 | Yan et al. |
| 8,904,051 | B2 | 12/2014 | Lee et al. |

(Continued)

FOREIGN PATENT DOCUMENTS

| | | |
|---|---|---|
| GB | 2486412 A | 6/2012 |
| GB | 2580364 A | 7/2020 |

OTHER PUBLICATIONS

Combined Search and Examination Report, dated May 30, 2023, from UK Patent Application No. GB2300785.9, pp. 1-8.

(Continued)

*Primary Examiner* — Henry Tsai
*Assistant Examiner* — Christopher A Daley
(74) *Attorney, Agent, or Firm* — Paradice & Li LLP

(57) ABSTRACT

A method performed by a docking station operable in a plurality of modes is disclosed. The method may include obtaining first data via a first interface of the docking station and second data via a second interface of the docking station, responsive to operating in a first mode of the plurality of modes. The first interface may be configured to couple the docking station to a computing device, and the second interface may be configured to communicate with a network. The method may also include obtaining third data via the second interface of the docking station, in lieu of the first interface, responsive to operating in a second mode of the plurality of modes. The method may further include selectively outputting the first data and the second data, or the third data, to a display based on whether the docking station operates in the first mode or the second mode.

20 Claims, 8 Drawing Sheets

(56) References Cited

U.S. PATENT DOCUMENTS

| | | | |
|---|---|---|---|
| 8,990,469 B2 | 3/2015 | Benhard et al. | |
| 10,025,748 B2 | 7/2018 | Chen et al. | |
| 11,076,031 B2 | 7/2021 | Kim et al. | |
| 11,360,534 B2 | 6/2022 | Decamp et al. | |
| 11,746,657 B2 | 9/2023 | Auduberteau et al. | |
| 12,073,205 B2 | 8/2024 | Tsang et al. | |
| 12,298,808 B2 * | 5/2025 | Lukanc | G06F 1/266 |
| 2005/0146741 A1 | 7/2005 | Collier et al. | |
| 2010/0188808 A1 | 7/2010 | Howarth et al. | |
| 2014/0160667 A1 | 6/2014 | Van Velzen et al. | |
| 2016/0195897 A1 | 7/2016 | Robinson et al. | |
| 2020/0051190 A1 | 2/2020 | Kamen et al. | |
| 2020/0218324 A1 | 7/2020 | Decamp et al. | |
| 2020/0219036 A1 | 7/2020 | Decamp et al. | |
| 2022/0062764 A1 | 3/2022 | Li | |
| 2022/0210730 A1 | 6/2022 | Peng et al. | |
| 2022/0327438 A1 | 10/2022 | Bach et al. | |
| 2023/0236632 A1 | 7/2023 | Lukanc et al. | |

OTHER PUBLICATIONS

Extended European Search Report dated Sep. 8, 2025, from European Patent Application No. 25191834.8-1218.

* cited by examiner

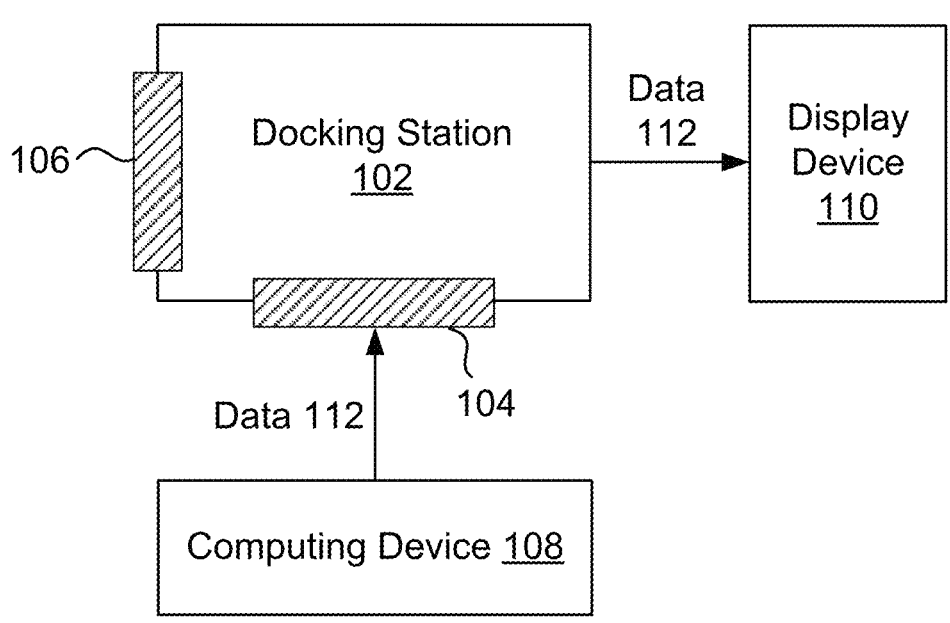
FIG. 1A

100B

100C

300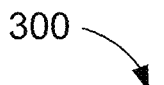

Obtain first data via a first interface of the docking station and second data via a second interface of the docking station, responsive to operating in a first mode of the plurality of modes, the first interface being configured to couple the docking station to a computing device and the second interface being configured to communicate with a network
310

Obtain third data via the second interface of the docking station, in lieu of the first interface, responsive to operating in a second mode of the plurality of modes
320

Selectively output the first data and the second data, or the third data, to a display based on whether the docking station operates in the first mode or the second mode
330

FIG. 3

NETWORK-CAPABLE DOCKING STATION

CROSS REFERENCE TO RELATED APPLICATIONS

This application is a continuation of U.S. patent application Ser. No. 17/581,126 filed Jan. 21, 2022, titled "NETWORK-CAPABLE DOCKING STATION," which is assigned to the assignee hereof. The disclosure of the prior Application is considered part of and is incorporated by reference in this Patent Application.

TECHNICAL FIELD

The present implementations relate generally to docking stations, and specifically to a docking station configured to communicate with a network and to support various applications.

BACKGROUND OF RELATED ART

A docking station provides a simplified interface for coupling, or otherwise enabling, a computing device (such as a laptop) to communicate with various peripherals (e.g., monitors, a keyboard, mouse, and webcam) or other devices. However, existing docking stations have limited functionality when not connected to an external computing device. For example, to allow users to reserve a docking station in a public or communal space, the users would need to employ an existing hoteling application which may require non-standard, specialized hardware to be placed near the docking station. As another example, to run diagnostics on such a docking station, a site administrator (or information technology (IT) professional) would need to couple a computing device (such as a laptop) to the docking station.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A method performed by a docking station operable in a plurality of modes is disclosed. The method may include obtaining first data via a first interface of the docking station and second data via a second interface of the docking station, responsive to operating in a first mode of the plurality of modes. The first interface may be configured to couple the docking station to a computing device, and the second interface may be configured to communicate with a network. The method may also include obtaining third data via the second interface of the docking station, in lieu of the first interface, responsive to operating in a second mode of the plurality of modes. The method may further include selectively outputting the first data and the second data, or the third data, to a display based on whether the docking station operates in the first mode or the second mode.

A controller for a docking station operable in a plurality of modes is disclosed. The controller may comprise a processing system and a memory. The memory may store instructions that, when executed by the processing system, cause the controller to obtain first data via a first interface of the docking station and second data via a second interface of the docking station, responsive to operating in a first mode of the plurality of modes. The first interface may be configured to couple the docking station to a computing device, and the second interface may be configured to communicate with a network. The instructions, when executed by the processing system, may further cause the controller to obtain third data via the second interface of the docking station, in lieu of the first interface, responsive to operating in a second mode of the plurality of modes. The instructions, when executed by the processing system, may further cause the controller to selectively output the first data and the second data, or the third data, to a display based on whether the docking station operates in the first mode or the second mode.

A system is disclosed. The system may comprise a display and a docking station coupled to the display. The docking station may be operable in a plurality of modes, and be configured to obtain first data via a first interface of the docking station and second data via a second interface of the docking station, responsive to operating in a first mode of the plurality of modes. The first interface may be configured to couple the docking station to a computing device, and the second interface may be configured to communicate with a network. The docking station may also be configured to obtain third data via the second interface of the docking station, in lieu of the first interface, responsive to operating in a second mode of the plurality of modes. The docking station may be further configured to selectively output the first data and the second data, or the third data, to the display based on whether the docking station operates in the first mode or the second mode.

BRIEF DESCRIPTION OF THE DRAWINGS

The present embodiments are illustrated by way of example and are not intended to be limited by the figures of the accompanying drawings.

FIG. 1A shows a block diagram depicting an example configuration of a docking station, in accordance with some embodiments.

FIG. 3 shows an illustrative flowchart depicting an example method performed by a docking station, in accordance with some embodiments.

DETAILED DESCRIPTION

Figure 1B:
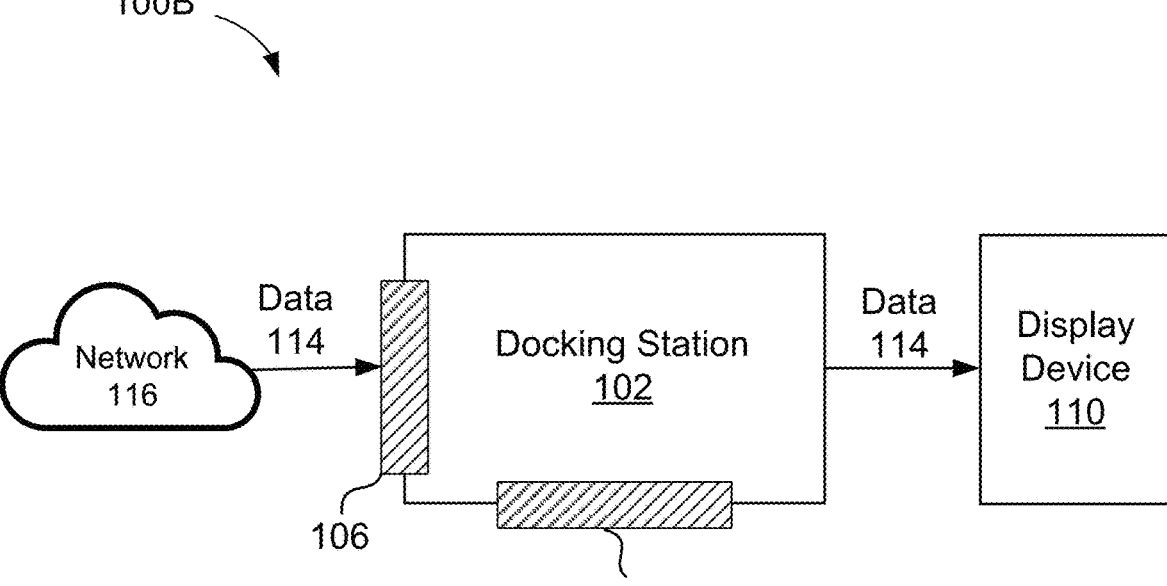
FIG. 1B shows a block diagram depicting an example configuration of a docking station, in accordance with some embodiments.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. The terms "first," "second," "third," "fourth," etc., as used herein, are not intended to indicate any sequence, amount or importance, but rather to distinguish various components or configurations. The phrase "in lieu of," as used herein, means "as an alternative to," "rather than," or "instead of," and is not intended to indicate any sequence or order. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, perform one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

Aspects of the disclosure relate to a docking station that is capable of communicating with a network. In some embodiments, the docking station may be operable in multiple modes (e.g., configurations), such as a first mode and a second mode. When operating in the first mode, the docking station may obtain data via a docking interface. The docking interface may be configured to couple the docking station to an external computing device such as a laptop, notebook, or tablet. When operating in the second mode, the docking station may obtain data via a network interface, instead of the docking interface. The network interface may be configured to communicate with a network such as a local area network (LAN), wide area network (WAN), the Internet, or a cloud network. Further, the docking station may output the data obtained via the docking interface or the network interface to a display, depending on whether the docking station operates in the first mode or the second mode.

By enabling docking stations to communicate with a network (such as when operating in the second mode), aspects of the present disclosure may support new features and applications for docking stations even when no external computing devices are coupled thereto. Example suitable applications may include hoteling applications, which are used to manage workspaces (e.g., desks, cubicles, and conference rooms), and/or equipment in the workspaces (e.g., a docking station connected to a network, monitor, keyboard, and mouse). For example, in a hoteling application, a docking station located in an office may (i) receive, via a network, a message indicating that the docking station is reserved for a particular user, and (ii) output the message to a display device. The docking station also may be configured to communicate with a manager or operator of the network, for example, to provide the network manager with information indicating (i) the operational health of the docking station, (ii) the operational health of one or more devices coupled to the docking station, and/or (iii) the environment near the docking station (e.g., the temperature or humidity of the office in which the docking station is located).

FIG. 1A shows a block diagram depicting an example configuration 100A of a docking station 102, in accordance with some embodiments. More specifically, FIG. 1A shows the docking station 102 in communication with a computing device 108 and a display device 110.

In some embodiments, the display device 110 may be a computer monitor, liquid crystal display (LCD), plasma display, cathode ray tube (CRT) display, light emitting diode (LED) display, organic light emitting diode (OLED) display, or any other type of display or visual interface configured to interface with the docking station 102. Further, the display device 110 may be configured to communicate with and/or receive power from the docking station 102.

In some aspects, the docking station 102 may include a docking interface 104 configured to dock (e.g., charge, provide power to, and/or communicate) with one or more electronic devices; and a network interface 106 configured to communicate with a network (not shown in FIG. 1A). The docking interface 104 may be configured to receive or otherwise couple to the computing device 108. In some embodiments, the docking interface 104 may communicate with the computing device 108 via a wired connection (such as USB-C or DisplayPort). In some other embodiments, the docking interface 104 may communicate with the computing device 108 via a wireless communication medium (such as in accordance with Wi-Fi, WiGig, Bluetooth, or various other wireless communication standards). In some embodiments, the computing device 108 may be a laptop, notebook, tablet, or other computing device configured to interface with the docking station 102. Further, the computing device 108 may be configured to communicate with and/or receive power from the docking station 102.

The network interface 106 may be configured to communicate with a network. In some embodiments, the network interface 106 may communicate with a network via a wired connection (such as Ethernet). In some other embodiments, the network interface 106 may communicate with the network via a wireless communication medium (such as in accordance with Wi-Fi or other wireless communication standards). While only two interfaces are shown in FIG. 1A for simplicity, the docking station 102 also includes an interface to receive or otherwise couple to the display device 110. Further, in some embodiments, the docking station 102 may include additional interfaces to receive or otherwise couple to other computing devices and/or peripherals.

As shown in FIG. 1A, when the docking station 102 operates in a first mode, the docking station 102 may obtain data 112 from the computing device 108 via the docking interface 104, and output the data 112 to the display device 110. For example, the data 112 may include text data, image data, and/or video data. In some embodiments, when operating in the first mode, the docking station 102 may output the data 112 to one or more display devices 110, and/or one or more peripherals (e.g., a keyboard, mouse, and/or webcam). Further, in some embodiments, when operating in the first mode, the docking station 102 may not output the data 112 to any display devices 110 and/or peripherals. In some embodiments, when operating in the first mode, the docking station 102 may transmit data from one or more display devices 110 and/or one or more peripherals to the computing device 108.

FIG. 1B shows a block diagram depicting an example configuration 100B of the docking station 102, in accordance with some embodiments. More specifically, FIG. 1B shows the docking station 102 in communication with a network 116 and the display device 110.

The network 116 may include a LAN, WAN, the Internet, a cloud network, private enterprise network, or other network suitable for interfacing with the docking station 102. In some embodiments, the network 116 may communicate with the docking station 102 via a wired connection (such as Ethernet). In some other embodiments, the network 116 may communicate with the docking station 102 via a wireless communication medium (such as in accordance with Wi-Fi or various other wireless communication standards).

As shown in FIG. 1B, when the docking station 102 operates in a second mode, the docking station 102 may obtain data 114 from the network 116 via the network interface 106, and output the data 114 to the display device 110. For example, the data 114 may include text data (e.g., ASCII text), image data (e.g., bitmap data), and/or video data. As another example, in some embodiments, the data 114 may include image data representing a logo and/or two-dimensional barcode (such as Quick Response (QR) code). In some embodiments, when operating in the second mode, the docking station 102 may output the data 114 to one or more display devices 110 and/or one or more peripherals. Further, in some embodiments, when operating in the second mode, the docking station 102 may not output the data 114 to any display devices 110 and/or peripherals. In some embodiments, when operating in the second mode, the docking station 102 may transmit data from one or more display devices 110 and/or one or more peripherals to the network 116.

Figure 1C:
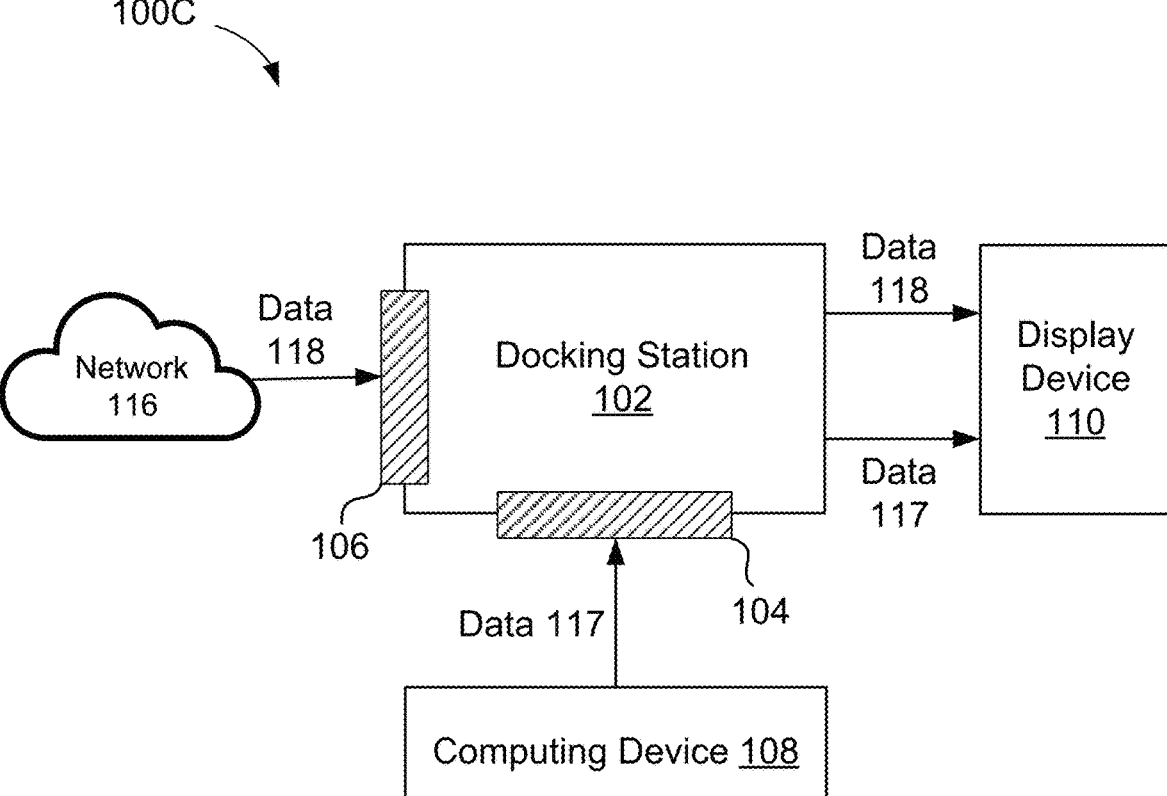
FIG. 1C shows a block diagram depicting an example configuration of a docking station, in accordance with some embodiments.

FIG. 1C shows a block diagram depicting an example configuration 100C of the docking station 102, in accordance with some embodiments. More specifically, FIG. 1C shows that, when operating in a third mode, the docking station 102 may receive data 117 and 118 from the computing device 108 and network 116, respectively, and output the data 117 and 118 to the display device 110. For example, the data 117 and/or 118 may include text data, image data, and/or video data. In some embodiments, when operating in the third mode, the docking station 102 may output the data 117 and/or 118 to one or more display devices 110, and/or one or more peripherals. For example, when operating in the third mode, the data 117 and 118 may be output to the display device 110 for display, where one of the data 117 or 118 is output as On-Screen Display (OSD) data that is overlayed on the other one. Further, in some embodiments, when operating in the third mode, the docking station 102 may not output the data 117 and/or 118 to any display devices 110 and/or peripherals. In some embodiments, when operating in the third mode, the docking station 102 may transmit data from one or more display devices 110 and/or one or more peripherals to the network 116 and/or the computing device 108. Further, in some embodiments, when operating in the third mode, the docking station 102 may transmit data from the computing device 108 to the network 116.

Figure 2:
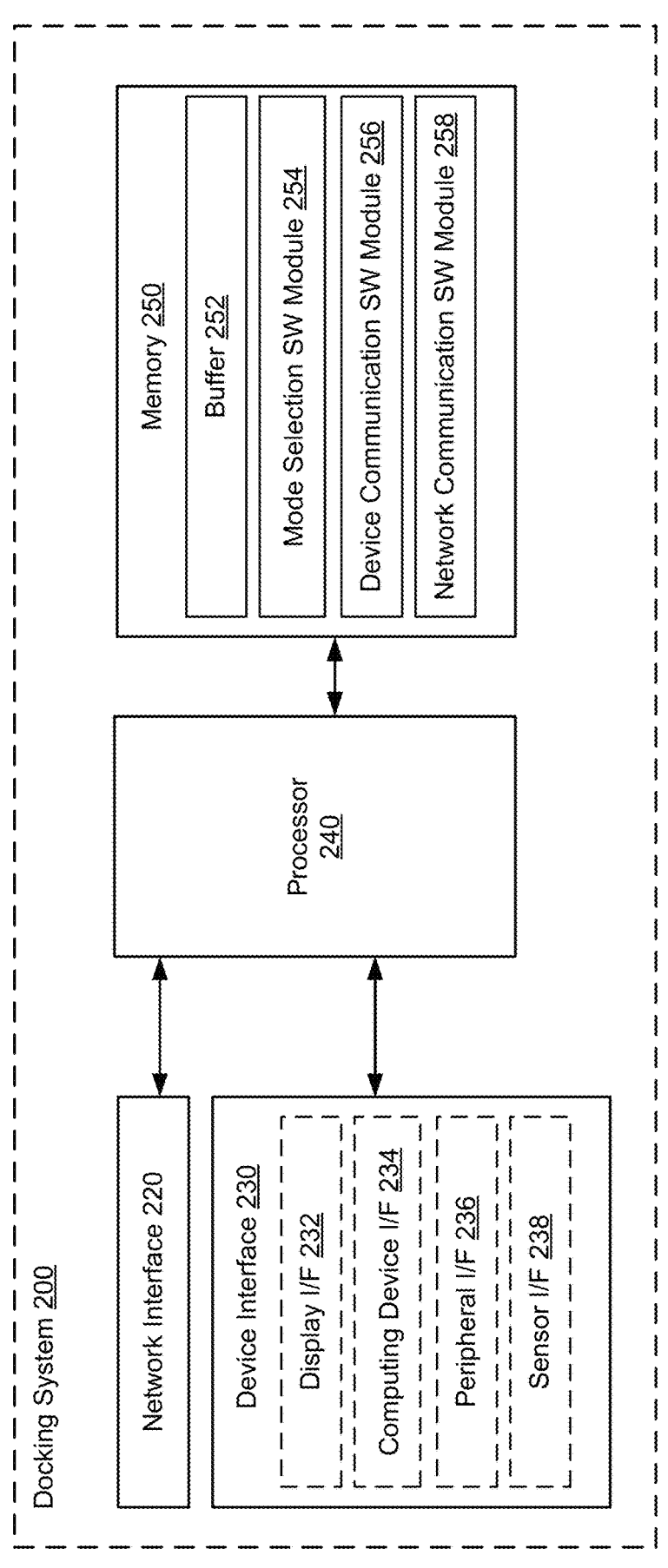
FIG. 2 shows a block diagram of a docking system, in accordance with some embodiments.

FIG. 2 shows a block diagram of a docking system 200 (also referred to as a "controller 200"), in accordance with some embodiments. The docking system 200 includes a network interface 220, a device interface 230, a processor 240, and a memory 250. For purposes of discussion herein, the processor 240 is shown in FIG. 2 as being coupled to the network interface 220, device interface 230, and memory 250. For actual embodiments, the network interface 220, device interface 230, processor 240, and/or memory 250 may be connected together using one or more buses (not shown for simplicity). It is noted that, in some embodiments, the docking system 200 may be an application specific integrated circuit (ASIC) (e.g., a microcontroller unit (MCU)) or other integrated circuit (IC) disposed on the docking station 102 described with reference to FIGS. 1A-1C. Moreover, in some embodiments, the docking system 200 may be a thin client.

The network interface 220 may transmit and receive signals to and from a network such as a LAN, WAN, the Internet, a cloud network, private enterprise network, or other network. In some aspects, the network interface 220 may be assigned a media access control (MAC) address to communicate with the network. The device interface 230 may transmit and receive signals to and from devices coupled to the docking system 200. In some embodiments, the device interface 230 may include display interface(s) 232, computing device interface(s) 234, peripheral interface (s) 236, and/or sensor interface(s) 238. The display interface 232 may be used to communicate with a display device and/or to provide a visual interface to a user of the docking system 200. The computing device interface 234 may be used to communicate with a computing device such as a laptop, notebook, or tablet. The peripheral interface 236 may be used to communicate with peripherals such as a mouse, keyboard, webcam, microphone, printer, headphones, speaker, data storage device, or game controller. The sensor interface 238 may be used to communicate with a sensor such as a thermometer, hygrometer, or other device that senses environmental conditions.

The memory 250 may include one or more buffers 252 to store data received from the network interface 220 and/or device interface 230, and to store data (including, for example text data (e.g., ASCII text), image data (e.g., bitmap data), and/or video data) generated by and/or received from the processor 240. For example, in one embodiment, at least one buffer 252 may be an overlay RAM configured to store OSD data including low-resolution text images. The memory 250 may also include a non-transitory computer-readable medium (e.g., one or more nonvolatile memory elements, such as EPROM, EEPROM, Flash memory, a hard drive, and so on) that may store at least the following software (SW) modules:

a mode (or configuration) selection SW module 254 to selectively switch an operation of the docking system 200 between a first mode, second mode, and third mode, based on the detection of a connection between the docking system 200 and (i) a computing device via the computing device interface 234, and/or (ii) a network via the network interface 220;

a device communication SW module 256 to communicate with and/or facilitate the provision of power to the device interface 230; and a network communication SW module 258 to communicate with the network interface 220.

Each SW module includes instructions that, when executed by the processor 240, cause the docking system 200 to perform the corresponding functions.

For example, in some embodiments, the processor 240 may execute the mode selection SW module 254 to select the first mode upon detecting that a computing device is docked to the docking system 200 via the computing device interface 234. In executing the mode selection SW module 254 to operate in the first mode, the processor 240 may obtain data from the computing device interface 234 and output the data to the display interface 232. In some embodiments, in executing the mode selection SW module 254 to operate in the first mode, the processor 240 may obtain data from the computing device interface 234 and output some or all of the data to one or more display interfaces 232, one or more peripheral interfaces 236 and/or one or more sensor interfaces 238. Further, in some embodiments, in executing the mode selection SW module 254 to operate in the first mode, the processor 240 may transmit data from one or more display interfaces 232, one or more peripheral interfaces 236, and/or one or more sensor interfaces 238, to the computing device interface 234.

As another example, in some embodiments, the processor 240 may execute the mode selection SW module 254 to select the second mode upon detecting that the docking system 200 is connected to a network via the network interface 220, but not connected to a computing device via the computing device interface 234. In executing the mode selection SW module 254 to operate in the second mode, the processor 240 may obtain data from the network interface 220 and output the data to the display interface 232. In some embodiments, in executing the mode selection SW module 254 to operate in the second mode, the processor 240 may obtain data from the network interface 220 and output some or all of the data to one or more display interfaces 232, one or more peripheral interfaces 236, and/or one or more sensor interfaces 238. Further, in some embodiments, in executing the mode selection SW module 254 to operate in the second mode, the processor 240 may transmit data from one or more display interfaces 232, one or more peripheral interfaces 236, and/or one or more sensor interfaces 238, to the network interface 220.

As another example, in some embodiments, the processor 240 may execute the mode selection SW module 254 to select a third mode upon detecting that the docking system 200 is connected to both (i) a computing device via the computing device interface 234, and (ii) a network via the network interface 220. In executing the mode selection SW module 254 to operate in the third mode, the processor 240 may obtain data from the computing device interface 234 and network interface 220 and output these data to the display interface 232. In some embodiments, in executing the mode selection SW module 254 to operate in the third mode, the processor 240 may obtain data from the computing device interface 234 and network interface 220, and output some or all of these data to one or more display interfaces 232, one or more peripheral interfaces 236, and/or one or more sensor interfaces 238. Further, in some embodiments, in executing the mode selection SW module 254 to operate in the third mode, the processor 240 may transmit data from one or more display interfaces 232, one or more peripheral interfaces 236, and/or one or more sensor interfaces 238, to the computing device interface 234 and/or network interface 220. Additionally, in some embodiments, in executing the mode selection SW module 254 to operate in the third mode, the processor 240 may transmit data between the network interface 220 and the computing device interface 234.

FIG. 3 shows an illustrative flowchart depicting an example method 300 performed by a docking station, in accordance with some embodiments. The method 300 may be performed by the docking station 102 of FIGS. 1A-1C or the docking system 200 of FIG. 2.

As an illustrative example, the method 300 may be performed by the docking station 102 of FIGS. 1A-1C, which is operable in a plurality of modes (e.g., configurations). The method 300 may include obtaining first data via a first interface of the docking station 102 and second data via a second interface of the docking station 102, responsive to operating in a first mode of the plurality of modes (310). It is noted that this first mode of the plurality of modes corresponds to the third mode depicted in FIG. 1C. The first interface may be configured to couple the docking station 102 to a computing device, and the second interface may be configured to communicate with a network.

The method 300 may also include obtaining third data via the second interface of the docking station 102, in lieu of (or as an alternative to) the first interface, responsive to operating in a second mode of the plurality of modes (320).

The method 300 may also include selectively outputting the first data and the second data, or the third data, to a display based on whether the docking station 102 operates in the first mode or the second mode (330).

Figure 4A:
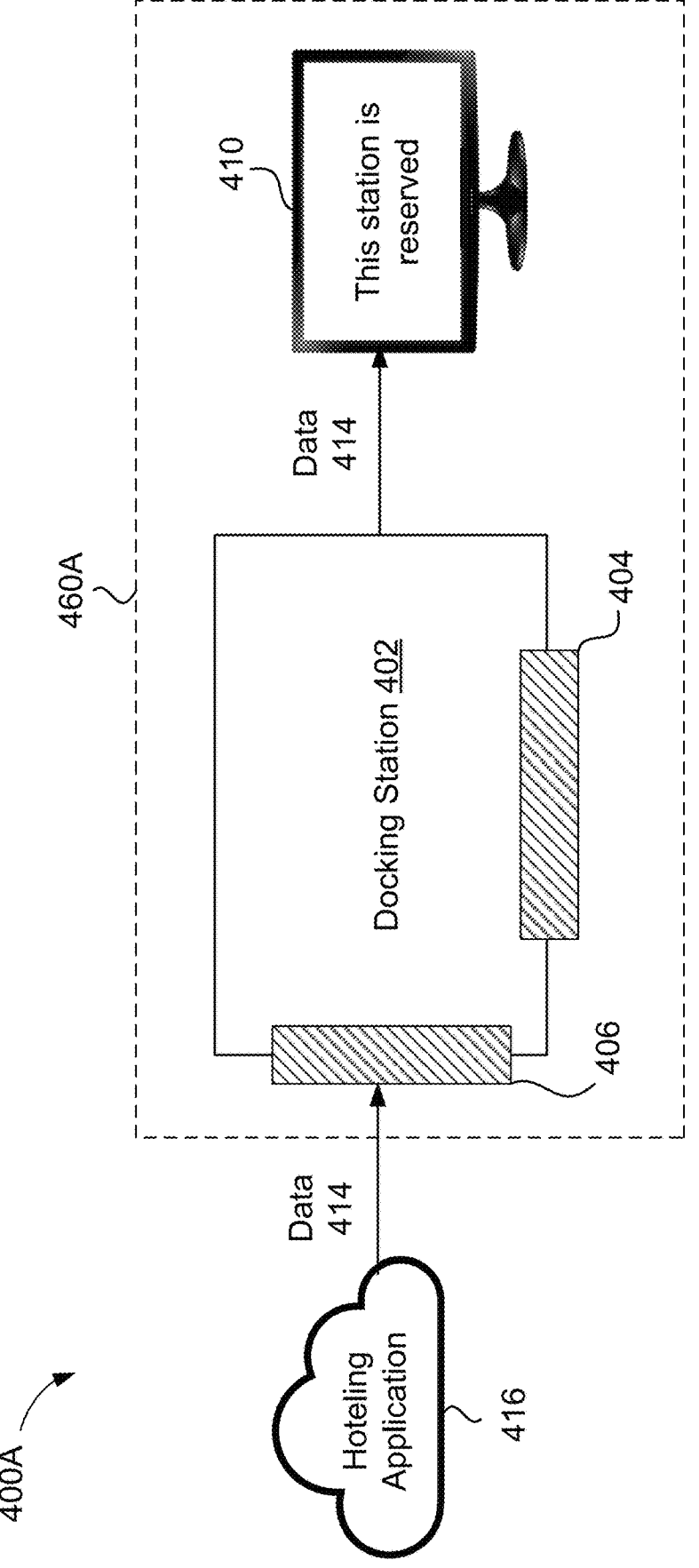
FIG. 4A shows an example application of a docking station operating in a second mode, in accordance with some embodiments.

FIG. 4A shows an example application 400A of a docking station 402 operating in a second mode, in accordance with some embodiments. The docking station 402 may be an embodiment of the docking station 102 of FIGS. 1A-1C or the docking system 200 of FIG. 2. As shown in FIG. 4A, the application 400A involves a network 416 and the station 460A, which includes the docking station 402 and a monitor 410. The network 416 and monitor 410 may be embodiments of the network 116 and display device 110, respectively, of FIG. 1B.

As an illustrative example, Company X may have an office that includes multiple stations, such as the station 460A, which provides a desktop computing environment for Company X's employees to use. In some embodiments, the station 460A may include additional monitors 410 and/or one or more peripherals. Company X's employees may have a flexible work schedule that allows them to work at the office two days per week and work from home three days per week. Prior to going to the office, each of Company X's employees may use a hoteling application to reserve a particular station at the office for use during one or more periods of time.

One Monday evening, from home, Company's X's employee, Employee Y, may use their company-issued laptop to access the hoteling application in network 416. Employee Y may use the hoteling application to reserve the station 460A for the next two days (Tuesday and Wednesday), when Employee Y plans to work at the office. In some embodiments, the hoteling application may notify Company X's cleaning team of the reservation, and the cleaning team may subsequently clean the station 460A.

Further, in some embodiments, the docking station 402 may obtain data 414 from the hoteling application in the network 416 via a network interface 406. The data 414 may include information associated the Employee Y's reservation such as the employee's name, the particular station reserved, the date and time of the reservation, and/or the status of the reservation (e.g., whether the reservation is active or canceled). The docking station 402 may then output some or all of data 414 to the monitor 410 for display. For example, as shown in FIG. 4A, the monitor 410 may display the message, "This station is reserved," to notify individuals (other than Employee Y) who walk by the station 460A early Tuesday morning, for example, that the station 460A is reserved and not available for use. In some embodiments, the message displayed may further communicate to such individuals that they should not approach and/or touch the station 460A in order to maintain the cleanliness of the station 460A. Further, in some embodiments, the message may continue to be displayed until Employee Y arrives at the office and couples their company-issued laptop with the station 460A. The message may also be displayed when Employee Y steps away from the station 460A during the reserved time period(s).

Accordingly, the docking station 402 provides a number of advantages. Because the docking station 402 communicates with the network 416, the docking station 402 supports the hoteling application by obtaining and outputting the message concerning the reservation to the monitor 410. Moreover, because the docking station 402 outputs the message concerning the reservation to the monitor 410 for display, the docking station 402 communicates information that may help keep station 460A clean and safe for Employee Y to use, which is especially important, for example, during a pandemic. Further, while some existing hoteling solutions require non-standard, special-purpose hardware, the docking station 402 obviates the need for such hardware.

While not shown in FIG. 4A, in some embodiments, the docking station 402 may include one or more LEDs and/or displays configured to communicate information associated with the docking station 402. For example, the information may relate to a reservation of the station 460A, the operational health of (e.g., diagnostic information associated with) the docking station 402, or information obtained from sensors or peripherals coupled to the docking station 402. Moreover, in some embodiments, when the station 460A is available for a reservation (e.g., not in use or out of service), the docking station 402 may output a message to the monitor 410 for display, indicating that the station 460A is available for reservation.

Figure 4B:
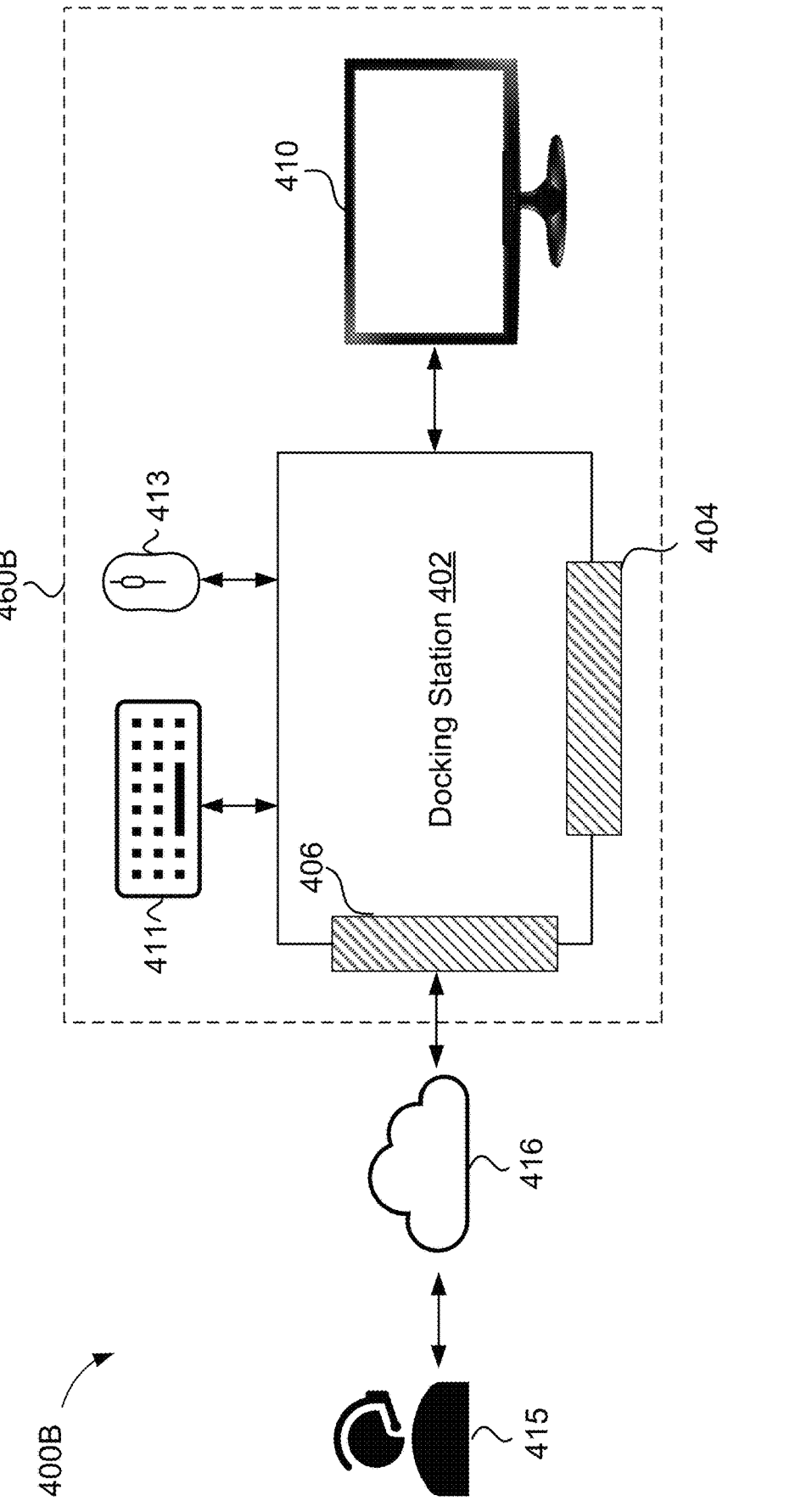
FIG. 4B shows an example application of a docking station operating in a second mode, in accordance with some embodiments.

FIG. 4B shows an example application 400B of the docking station 402 operating in the second mode, in accordance with some embodiments. As shown in FIG. 4B, the application 400B involves an IT professional 415, the network 416, and a station 460B, which includes the docking station 402, the monitor 410, a keyboard 411, and a mouse 413. The station 460B may be an embodiment of the station 460A of FIG. 4A.

Continuing with the example of FIG. 4A, Monday evening, after Employee Y reserves the station 460A of FIG. 4A (or station 460B of FIG. 4B), the IT professional 415 (who works for Company X) may communicate, via the network 416, with docking station 402 to determine the operational health of (i) the docking station 402 and/or (ii) one or more devices coupled to the docking station 402. In some embodiments, the docking station 402 may communicate with the keyboard 411, mouse 413, and/or monitor 410 to determine the operational health of one or more of these devices. The docking station 402 may determine, for example, that each of the keyboard 411, mouse 413, and monitor 410 is powered on, and that the mouse 413 needs a firmware update. The docking station may subsequently communicate this determination to the IT professional 415 via the network 416. In some embodiments, the IT professional 415 may then facilitate remotely, via the network 416 and docking station 402, the transfer and installation of the firmware update to the mouse 413. Accordingly, when the docking station 402 operates in the second mode, the docking station 402 may support remote monitoring and maintenance of the docking station 402 and devices coupled to the docking station 402.

While not shown in FIG. 4B, in some embodiments, the docking station 402 may be coupled to one or more sensors such as a thermometer and/or hygrometer used to sense environmental conditions near the docking station 402. In some embodiments, the docking station 402 may be configured to transmit information from these sensors to the IT professional 415 via the network 416. Moreover, in some embodiments, when the station 460B is not available for reservation due to, for example, a technical issue with the docking station 402 or one or more peripherals coupled to the docking station 402, the docking station 402 may output a message to the monitor 410 for display, indicating that the station 460B is out of service and not available for reservation.

Figure 4C:
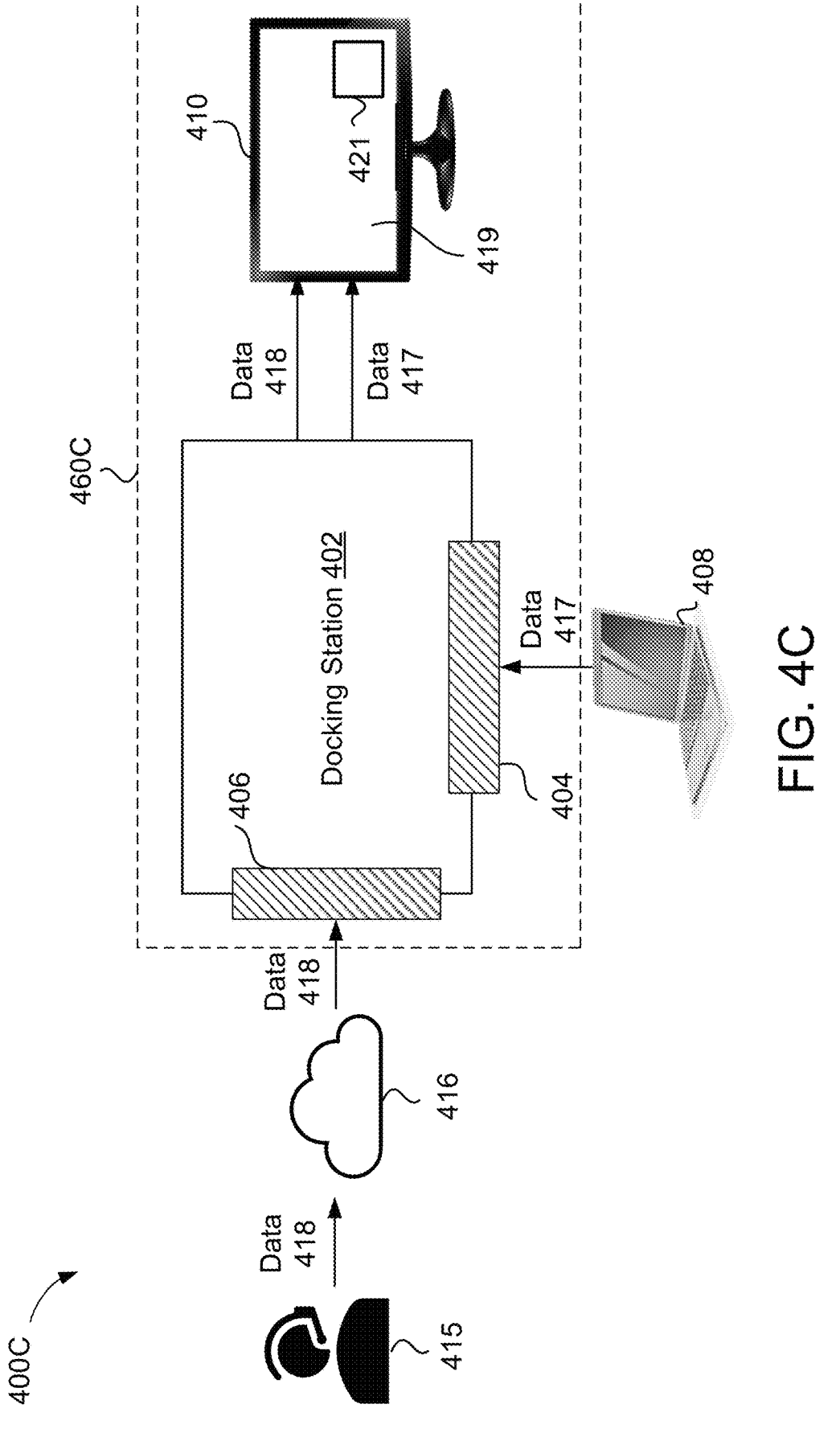
FIG. 4C shows an example application of a docking station operating in a third mode, in accordance with some embodiments.

FIG. 4C shows an example application 400C of the docking station 402 operating in a third mode, in accordance with some embodiments. As shown in FIG. 4C, the application 400C involves the IT professional 415, the network 416, a laptop 408, and a station 460C, which includes the docking station 402, and the monitor 410. The station 460C may be an embodiment of the station 460A or 460B in FIGS. 4A and 4B, respectively. The laptop 408 may be an embodiment of the computing device 108 in FIGS. 1A and 1C. In some embodiments, the station 460C may include additional devices, such as a second monitor 410, keyboard, and mouse.

Continuing with the example of FIGS. 4A and 4B, Tuesday morning, Employee Y may arrive at the office and walk to station 460A of FIG. 4A (or station 460C of FIG. 4C), where Employee Y plans to work. While at the station 460C, Employee Y may dock Employee Y's company-issued laptop 408 with the docking station 402 via a docking interface 404. The docking station 402 may then obtain data 417 (e.g., text data, image data, and/or video data) from the laptop 408 and output the data 417 to the monitor 410 for display.

While Employee Y works at the station 460C, the IT professional 415 may communicate with the docking station 402, via the network 416, to determine the operational health of the laptop 408. The docking station 402 may then communicate with the laptop 408 and determine that the laptop 408 needs a software update. In some embodiments, the docking station 402 may then communicate this determination to the IT professional 415. Further, in some embodiments, the docking station 402 may obtain, from the IT professional 415, data 418 via the network 416. The data 418 may include information directed to Employee Y concerning the software update, such as a request for Employee Y to specify a time for the software update to be installed. The docking station 402 may then output some or all of data 418, including the request, to the monitor 410 for display in window 421. In some embodiments, the window 421 may be overlayed on the data 417 displayed on the monitor 410. Employee Y may then view some or all of data 418, including the request, in window 421.

In some embodiments, Employee Y may respond to the request by, for example, using the laptop 408 to send a message to the IT professional 415 (via the docking station 402 and network 416), indicating that Employee Y would like for the software update to be installed on the laptop 408 later that day at 4 PM. At 4 PM, the IT professional 415 may facilitate remotely, via the network 416 and docking station 402, the transfer and installation of the software update to the laptop 408. Accordingly, when the docking station 402 operates in the third mode, the docking station 402 permits the IT professional 415 to monitor and/or maintain the operational health of Employee Y's laptop 408, and to communicate with Employee Y.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method, comprising:
   obtaining, by a docking station operating in a first mode of a plurality of modes, first data via a first interface of the docking station, the first interface being configured to couple the docking station to a computing device;
   obtaining, by the docking station operating in a second mode of the plurality of modes, second data via a second interface of the docking station, in lieu of the first interface, the second interface being configured to communicate with a network; and
   selectively outputting, to a display via a third interface of the docking station different from the first interface and the second interface, the first data or the second data in response to the docking station operating in the first mode or the second mode, respectively, wherein the selectively outputting further comprises determining that the computing device is not coupled to the docking station and operating in the second mode in response to determining that the computing device is not coupled to the docking station.

2. The method of claim 1, wherein one of the first data and the second data comprises on-screen display data.

3. The method of claim 1, wherein one of the first data and second data is overlayed on at least a portion of other data being displayed on the display.

4. The method of claim 1, further comprising:

obtaining, by the docking station operating in a third mode of the plurality of modes, the first data from the first interface and the second data from the second interface; and outputting, to the display via the third interface of the docking station, at least one of the first data or the second data in response to the docking station operating in the third mode.

5. The method of claim 4, wherein at least one of the first data or the second data comprises on-screen display data.

6. The method of claim 4, wherein at least one of the first data or the second data is overlayed on at least a portion of other data being displayed on the display.

7. The method of claim 1, wherein the docking station comprises a memory configured to store on-screen display data for output to the display via the third interface of the docking station.

8. The method of claim 1, wherein at least one of the first data or the second data comprises at least one of text data, image data, or video data.

9. The method of claim 1, further comprising:

obtaining, via the second interface, at least one of a firmware or software update.

10. A docking station, comprising:

at least one processor; and a memory storing instructions that, when executed by the at least one processor, cause the docking station to:

obtain, by the docking station operating in a first mode of a plurality of modes, first data via a first interface of the docking station, the first interface being configured to couple the docking station to a computing device;

obtain, by the docking station operating in a second mode of the plurality of modes, second data via a second interface of the docking station, in lieu of the first interface, the second interface being configured to communicate with a network; and selectively output, to a display via a third interface of the docking station different from the first interface and the second interface, the first data or the second data in response to the docking station operating in the first mode or the second mode, respectively, wherein the selectively outputting further comprises determining that the computing device is not coupled to the docking station and operating in the second mode in response to determining that the computing device is not coupled to the docking station.

11. The docking station of claim 10, wherein one of the first data and the second data comprises on-screen display data.

12. The docking station of claim 10, wherein one of the first data and second data is overlayed on at least a portion of other data being displayed on the display.

13. The docking station of claim 10, wherein execution of the instructions further causes the docking station to:

obtain, by the docking station operating in a third mode of the plurality of modes, the first data from the first interface and the second data from the second interface; and output, to the display via the third interface of the docking station, at least one of the first data or the second data in response to the docking station operating in the third mode.

14. The docking station of claim 13, wherein at least one of the first data or the second data comprises on-screen display data.

15. The docking station of claim 13, wherein at least one of the first data or the second data is overlayed on at least a portion of other data being displayed on the display.

16. The docking station of claim 10, wherein the memory is further configured to store on-screen display data for output to the display via the third interface of the docking station.

17. A system, comprising:

a display; and a docking station coupled to the display, the docking station being configured to:

obtain, by the docking station operating in a first mode of a plurality of modes, first data via a first interface of the docking station, the first interface being configured to couple the docking station to a computing device;

obtain, by the docking station operating in a second mode of the plurality of modes, second data via a second interface of the docking station, in lieu of the first interface, the second interface being configured to communicate with a network; and selectively output, to the display via a third interface of the docking station different from the first interface and the second interface, the first data or the second data in response to the docking station operating in the first mode or the second mode, respectively, wherein the selectively outputting further comprises determining that the computing device is not coupled to the docking station and operating in the second mode in response to determining that the computing device is not coupled to the docking station.

18. The system of claim 17, wherein at least one of the first data or the second data comprises on-screen display data.

19. The system of claim 17, wherein the docking station comprises a memory configured to store on-screen display data for output to the display via the third interface of the docking station.

20. The system of claim 17, wherein the docking station is further configured to:

obtain, by the docking station operating in a third mode of the plurality of modes, the first data from the first interface and the second data from the second interface; and output, to the display via the third interface of the docking station, at least one of the first data or the second data in response to the docking station operating in the third mode.

* * * * *